United States Patent [19]

Kato et al.

[11] Patent Number: 5,416,669
[45] Date of Patent: May 16, 1995

[54] LIGHT SOURCE APPARATUS

[75] Inventors: Hideyuki Kato, Nishio; Sinji Namba, Kariya, both of Japan

[73] Assignee: Nippondenso Co., Ltd., Kariya, Japan

[21] Appl. No.: 3,974

[22] Filed: Jan. 19, 1993

[30] Foreign Application Priority Data

Jan. 20, 1992 [JP] Japan .................... 4-7509
Nov. 13, 1992 [JP] Japan .................. 4-302795

[51] Int. Cl.⁶ .................... F21V 7/04; F21V 7/00; G01D 11/28
[52] U.S. Cl. ........................ 362/32; 362/26; 362/304
[58] Field of Search ................ 362/32, 26, 304

[56] References Cited

U.S. PATENT DOCUMENTS

| | | | |
|---|---|---|---|
| 3,564,231 | 2/1971 | Bruce | 362/32 |
| 4,009,381 | 2/1977 | Schreiber et al. | 362/32 |
| 4,422,135 | 12/1983 | McCamy | 362/304 |
| 4,460,939 | 7/1984 | Murakami et al. | 362/32 |
| 4,545,000 | 10/1985 | Fraley et al. | 362/304 |
| 4,755,918 | 7/1988 | Pristash et al. | |
| 4,811,172 | 3/1989 | Davenport et al. | |
| 4,912,605 | 3/1990 | Whitehead | 362/32 |
| 4,947,293 | 8/1990 | Johnson et al. | 362/32 |
| 5,222,793 | 6/1993 | Davenport et al. | 362/32 |
| 5,249,111 | 9/1993 | Richardson | 362/304 |

FOREIGN PATENT DOCUMENTS

| | | | |
|---|---|---|---|
| 1383413 | 11/1964 | France | 362/32 |
| 0375649 | 5/1923 | Germany | 362/304 |
| 63-314703 | 12/1988 | Japan . | |
| 1243301 | 9/1989 | Japan . | |
| 3171019 | 7/1991 | Japan . | |

Primary Examiner—Richard A. Bertsch
Assistant Examiner—Xuan M. Thai
Attorney, Agent, or Firm—Cushman, Darby & Cushman

[57] ABSTRACT

A light source apparatus for directing light from a light source into a plurality of optical fibers. The light source apparatus comprises a case which has an end, and the optical fibers are disposed at each end thereof and which encloses the light source. The case has on its inner wall a first group of ellipsoidal mirrors and a second group of ellipsoidal mirrors disposed symmetrically with respect to the light source. The light emitted from the light source is reflected by the first and second groups of ellipsoidal mirrors so as to be condensed on the end surfaces of the optical fibers to be outputted from the other end surfaces of the optical fibers. This arrangement can simultaneously offer a plurality of illumination sources and improve the efficiency of light condensation on the end surfaces of the optical fibers.

18 Claims, 10 Drawing Sheets

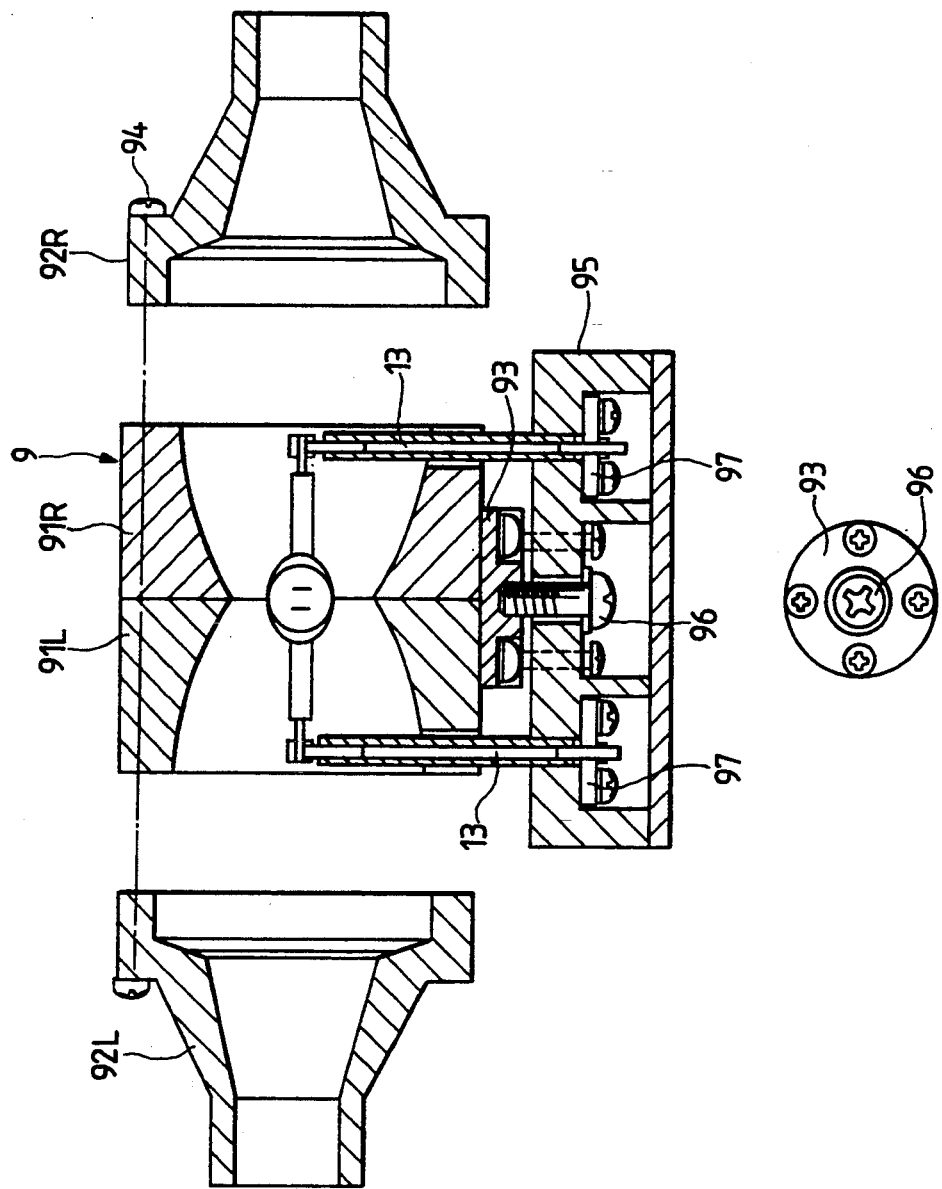

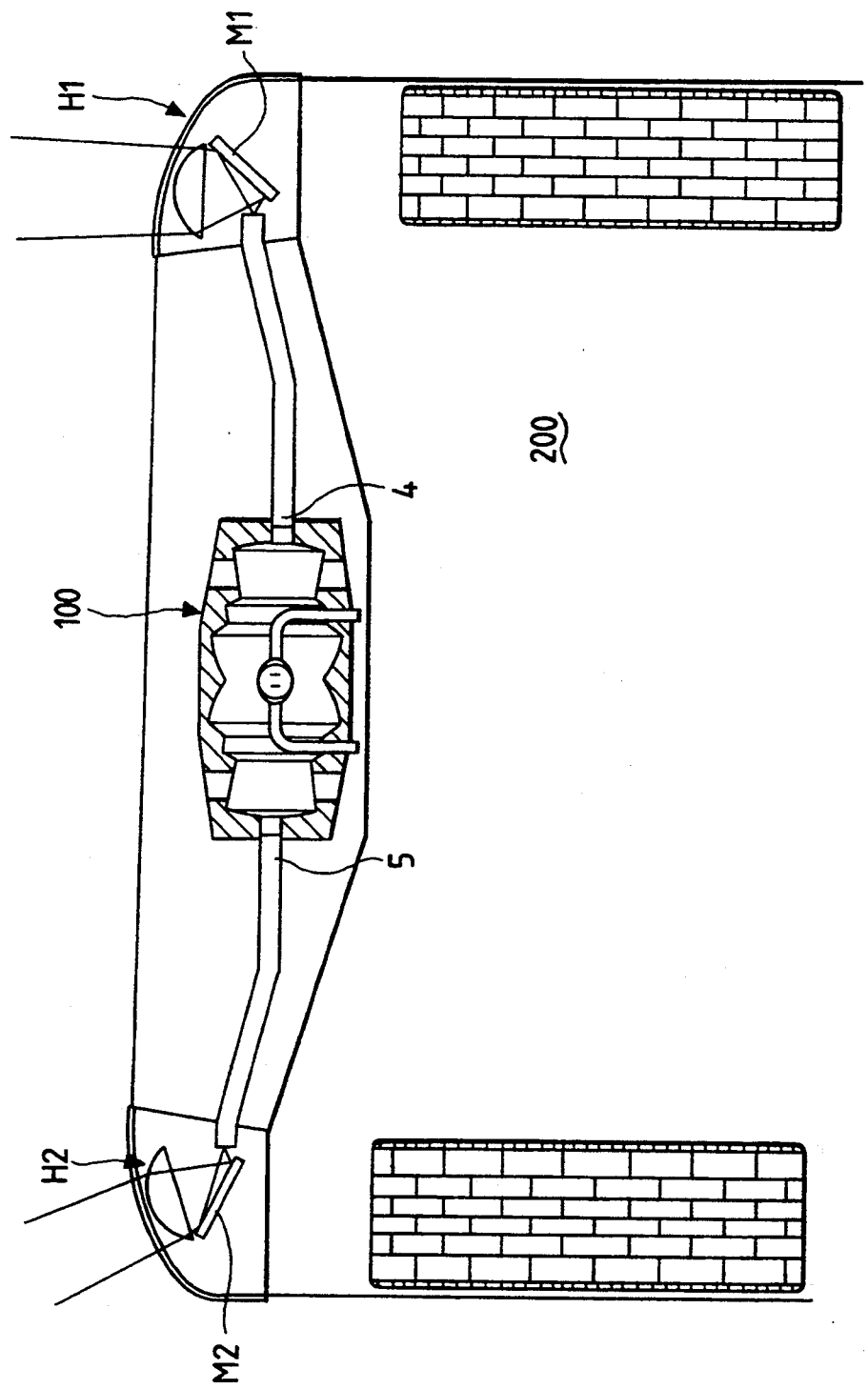

LIGHT SOURCE APPARATUS

BACKGROUND OF THE INVENTION

1. Field of the Invention

The present invention relates to a light source apparatus for condensing light, emitted from a light source, onto an end surface of an optical fiber to lead it to a desired position through the optical fiber.

2. Description of the Related Art

A conventional light source apparatus is arranged such that as illustrated in FIG. 1, light emitted from a light source L is reflected by a spheroidal mirror M to be condensed on an end surface (light-receiving surface) of an optical fiber F so as to be led through the optical fiber F to a desired position. That is, this convention light source apparatus is of a type that the light from one light source is condensed on one optical fiber. According to this conventional light source apparatus, of the light incident on the end surface of the optical fiber F, the light whose incident angle α is above about 30 degrees cannot passes through the optical fiber F because total reflection within the optical fiber F of this light does not occur. Particularly, when the light source L has a width indicated by character d, the focal point is not determined to, thereby deteriorating the efficiency of light condensation. Accordingly, in the conventional light source apparatus, the limit of the efficiency of light condensation is about 42% in the case of a point light source and about 15% in the case of a light source having the width d of 3 mm. One possible solution is to dispose a concave reflection mirror in opposed relation to the spheroidal mirror M to improve the efficiency of the light condensation. However, difficulty is encountered to sufficiently improve the efficiency of the light condensation through the provision of the concave reflection mirror concurrently with providing more than two illumination sources.

SUMMARY OF THE INVENTION

It is therefore an object of the present invention to provide a light source apparatus which is capable of sharply improving the efficiency of light condensation with respect to the optical fiber and to use one light source to illumination two optical fiber.

A light source apparatus according to this invention comprises a case which is equipped with two optical fibers and which encloses a light source. The case has on its inner wall a first group of ellipsoidal mirrors and a second group of ellipsoidal mirrors disposed symmetrically with respect to the light source. The light emitted from the light source is reflected by the first and second groups of ellipsoidal mirrors so as to be condensed on the end surfaces of the optical fibers to be outputted from the other end surfaces of the optical fibers. This arrangement can simultaneously offer a plurality of illumination sources and improve the efficiency of light condensation on the end surfaces of the optical fibers up to about 65% in the case of a point light source and about 50% in the case of a line light source having a width of 3 mm.

BRIEF DESCRIPTION OF THE DRAWINGS

The object and features of the present invention will become more readily apparent from the following detailed description of the preferred embodiments taken in conjunction with the accompanying drawings in which:

FIG. 9 shows a structure of another case to be used for the light source apparatus according to the fifth embodiment of this invention; and FIG. 10 shows a light source apparatus according to this invention which is applied to headlamps of a motor vehicle.

DETAILED DESCRIPTION OF THE INVENTION

Figure 1:
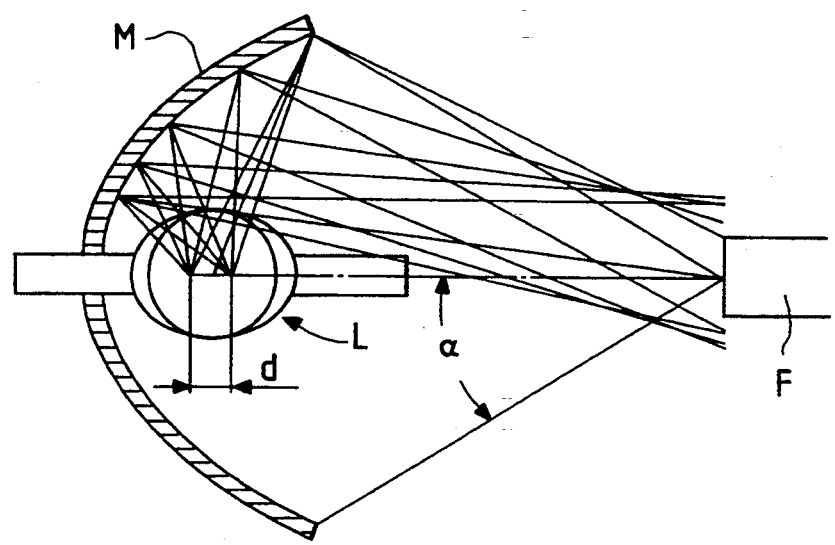
FIG. 1 is a cross-sectional view showing an arrangement of a conventional light source apparatus.
Figure 2:
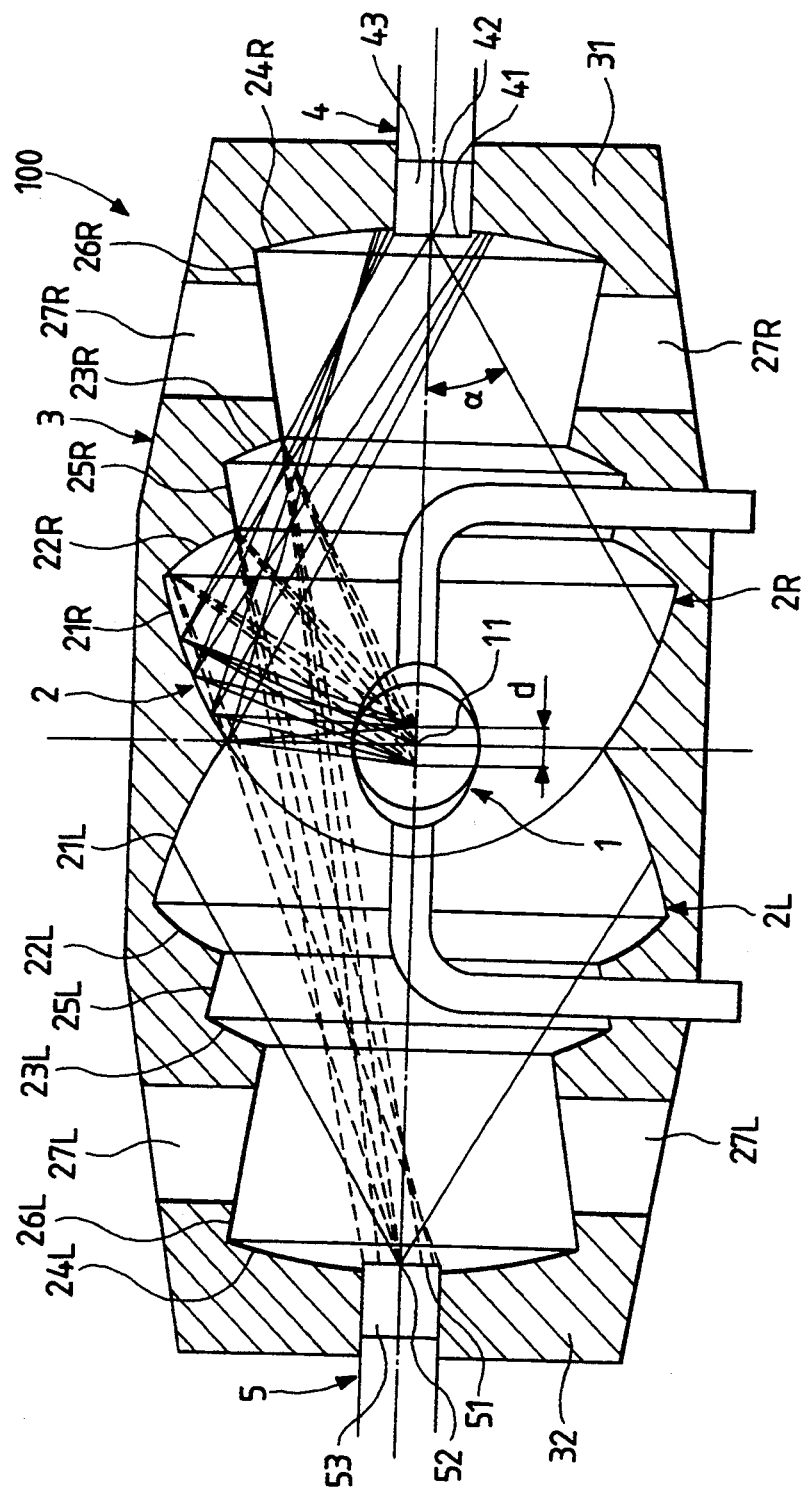
FIG. 2 is a cross-sectional view showing an arrangement of a light source apparatus according to a first embodiment of this invention.

Referring now to FIG. 2, a description of a light source apparatus according to a first embodiment of this invention is provided below. In FIG. 2, this light source apparatus, designated at 100, comprises a light source 1 disposed at the center position of a case 3 having a substantial cylindrical configuration and having on its inner wall a circular reflecting surface assembly 2 including a plurality of circular reflecting surfaces which are spheroidal surfaces. The light source apparatus 100 further comprises optical fibers 4 and 5 respectively fixedly secured to the center portions of both end (side) walls 31 and 32 of the case 3 so as to be disposed in opposed relation to each other. In this embodiment, the light source 1 is a discharge tube whose discharge distance is d and further is a line light source positioned at the center portion of the central axis of the circular reflecting surface assembly 2 and in parallel to the central axis thereof.

The circular reflecting surface assembly 2 comprises a group of ellipsoidal reflecting mirrors 2R and a group of ellipsoidal reflecting mirrors 2L symmetrically disposed at the right and left sides with respect to a plane (symmetry plane) perpendicular to the axis including the center 11 of the line light source 1. The right-side ellipsoidal reflecting mirror group 2R comprises a first right-side ellipsoidal mirror 21R whose one focal point is the center 11 of the line light source 1 and the other focal point is the center 42 of one end surface 41 of the optical fiber 4 disposed at the right side in the illustration, a second right-side ellipsoidal mirror 22R whose one focal point is the center 11 and the other focal point is the center 52 of one end surface 51 of the optical fiber 5 disposed at the left side in the illustration, a third right side ellipsoidal mirror 23R whose distance between two fixed points (the center 11 and the center 42) is set to be longer as compared with the second right-side ellipsoidal mirror 22R, and a fourth right-side ellipsoidal mirror 24R whose distance between the two fixed points is set to be longer as compared with the third right-side ellipsoidal mirror 23R.

Between the second right-side ellipsoidal mirror 22R and the third right-side ellipsoidal mirror 23R there is provided a right-side conical surface 25R which is a plane of a radiation from the center 52 of the end surface 51 of the left-side optical fiber 5 (or which corresponds to a portion of the plane of a circular cone whose fixed point is the center 52 of the left-side optical fiber 5 end surface 51), and between the third right-side ellipsoidal mirror 23R and the fourth right-side ellipsoidal mirror 24R there is provided a conical surface 26R which is a plane of a radiation from the center 52 of the end surface 51 of the optical fiber 5 (or which corresponds to a portion of the plane of another circular cone whose fixed point is the center 52 thereof). Thus, the right-side ellipsoidal reflecting mirror group 2R results in having a stepped configuration. In this embodiment, a ventilating hole 27R is formed in the conical surface 6R so as to cool the inside of the case 3.

Similarly, the left-side ellipsoidal reflecting mirror group 2L comprises first to fourth left-side ellipsoidal mirrors 21L to 24L which are disposed in symmetrical relation to the first to fourth right-side ellipsoidal mirrors 21R to 24R. Further, in the left-side ellipsoidal reflecting mirror group 2L, there are provided left-side conical surfaces 25L, 26L and a left-side ventilating hole 27L respectively disposed in symmetrical relation to the right-side conical surfaces 25R, 26R and the right-side ventilating hole 27R.

In this light source apparatus 100, the light emitted from the light source 1 is reflected on the first right-side ellipsoidal mirror 21R, the second left-side ellipsoidal mirror 22L, the third left-side ellipsoidal mirror 23L and the fourth left-side ellipsoidal mirror 24L so as to be condensed to the end surface 41 of the right-side optical fiber 4. Since the light source 1 has the width d, the light beams are incident on the end surface 41 as indicated by dotted lines in the illustration. As the incident angle $\alpha$ of the light on the end surface 41 is closer to zero, the transmission factor becomes greater, and as the incident angle $\alpha$ becomes larger, the transmission factor lowers. When the incident angle $\alpha$ is above about 30 degrees, the incident light is not total-reflected on the circumferential surface of the optical fiber, thus not passing through the optical fiber. Thus, the designing conditions such as the width d of the light source, the width of each of the ellipsoidal mirrors and the diameter of the end surface of the optical fiber are required to be determined taking into account this point.

Simultaneously, the light emitted from the light source 1 is reflected on the first left-side ellipsoidal mirror 21L, the second right-side ellipsoidal mirror 22R, the third right-side ellipsoidal mirror 23R and the fourth right-side ellipsoidal mirror 24R so as to be condensed on the end surface 51 of the left-side optical fiber 5. As a result, most of the light emitted from the light source 1 is reflected by the right-side ellipsoidal reflecting mirror group 2R and the left-side ellipsoidal reflecting mirror group 2L so as to be allowed to be incident on the end surfaces 41 and 51 of the optical fibers 4 and 5 with the incident angle $\alpha$ being below about 30 degrees. Thus, this light source apparatus can offer a higher efficiency of light condensation as compared with the apparatus with one optical fiber.

Here, in the case that the internal temperature of the case 3 excessively increases, it is appropriate that one of the ventilating holes 27R and 27L is connected to a forced ventilating means such as a blower or that a plurality of ventilating holes (27R, 27L) are constructed so that one of them is coupled to the forced ventilating means. Moreover, although the optical fibers 4 and 5 can be constructed with a light transmission material such as a glass and plastic, it is more preferable that end portions 43 and 53 respectively including the condensed end surfaces 41 and 51 are made of a heat resisting glass.

Figure 3:
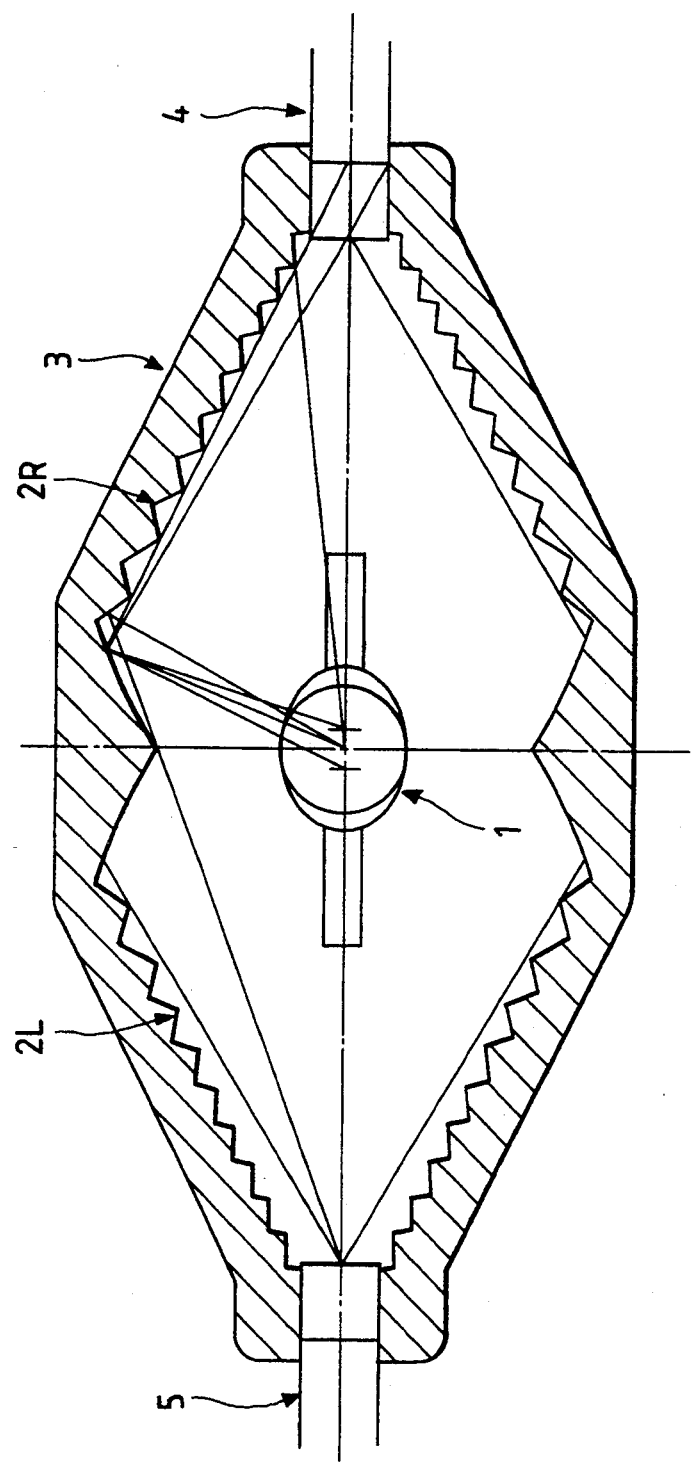
FIG. 3 is a cross-sectional view showing an arrangement of a light source apparatus according to a second embodiment of this invention.

FIG. 3 is a cross-sectional view showing an arrangement of a light source apparatus according to a second embodiment of this invention. One feature of this embodiment is that as illustrated in FIG. 3 the number of steps constituting each of the right-side and left-side ellipsoidal mirror groups 2R and 2L is increased as compared with the light source apparatus 100 illustrated in FIG. 2. The increase in the step number allows the size-reduction of the reflecting mirrors. In the case of increasing the step number, even if conical mirrors are used in place of the ellipsoidal mirrors, the efficiency of light condensation can be kept to some extent. In addition, it is possible to easily manufacture the reflecting surfaces of the reflecting mirrors.

Figure 4:
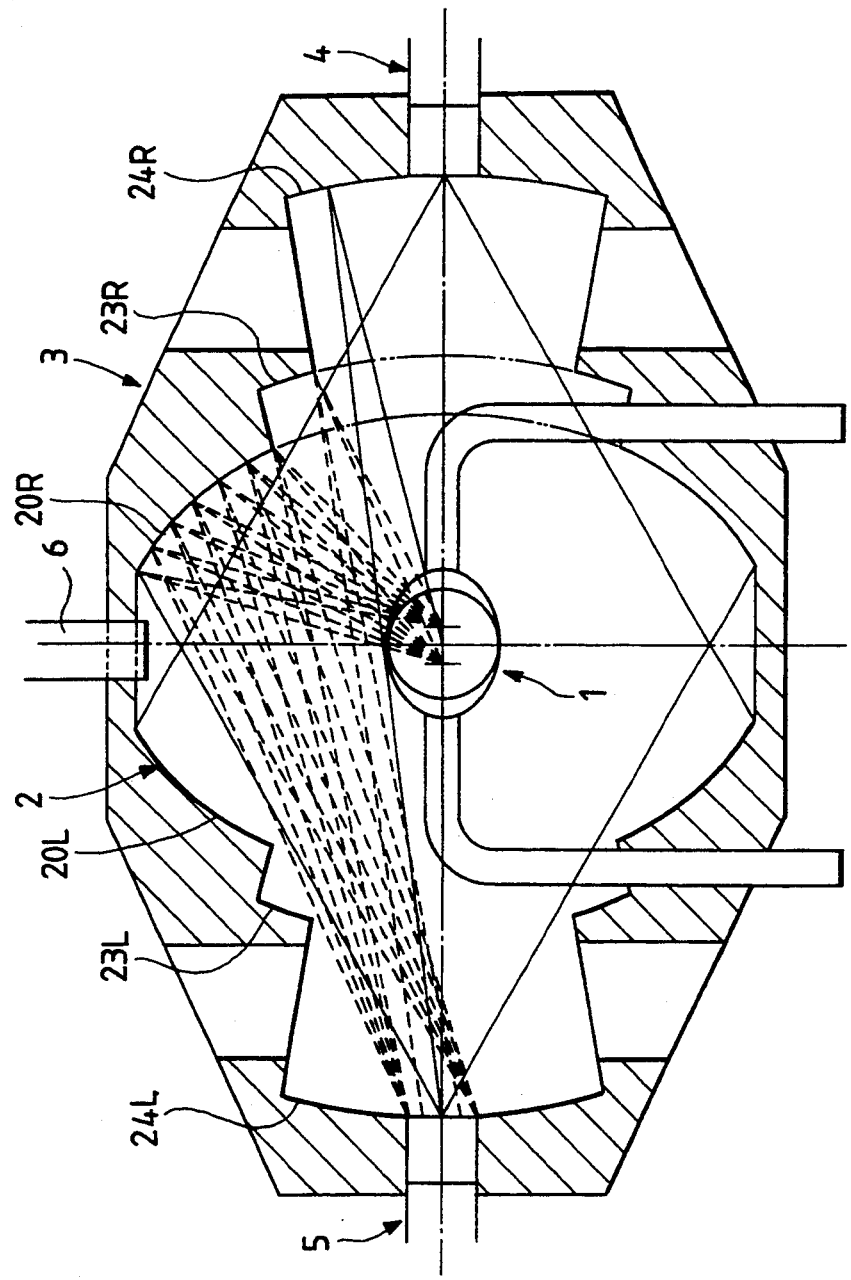
FIG. 4 is cross-sectional view showing an arrangement of a light source apparatus according to a third embodiment of this invention.

FIG. 4 is cross-sectional view showing an arrangement of a light source apparatus according to a third embodiment of this invention. One feature of this embodiment is that the first right-side ellipsoidal mirror 21R and the first left-side ellipsoidal mirror 21L illustrated in FIG. 2 are not provided but portions respectively corresponding to the second right-side ellipsoidal mirror 22R and the second left-side ellipsoidal mirror 22L illustrated in FIG. 2 are enlarged therefor so as to form a large right-side ellipsoidal mirror 20R and a large left-side ellipsoidal mirror 20L as illustrated in FIG. 4. According to this embodiment, although the diameter of the case 3 increases as compared with the above-described first embodiment, it is possible to improve the efficiency of light condensation on calculation. If using, as the light source 1, a discharge tube having a width of d=3 mm, the efficiency of light condensation becomes 54% when the diameter of the optical fiber is 6 mm, the efficiency of light condensation becomes 69% when being 7 mm, and the efficiency of light condensation becomes 69% when being 8 mm.

Since the cylindrical inner circumferential wall between the large right-side and left-side ellipsoidal mirrors 20R and 20L is not used for the light condensation, it is possible to provide a number of auxiliary optical fibers 6 therein, or it is possible to form an ellipsoidal mirror on the aforementioned inner circumferential wall in addition to few optical fibers so as to effectively use the light source.

Figure 5:
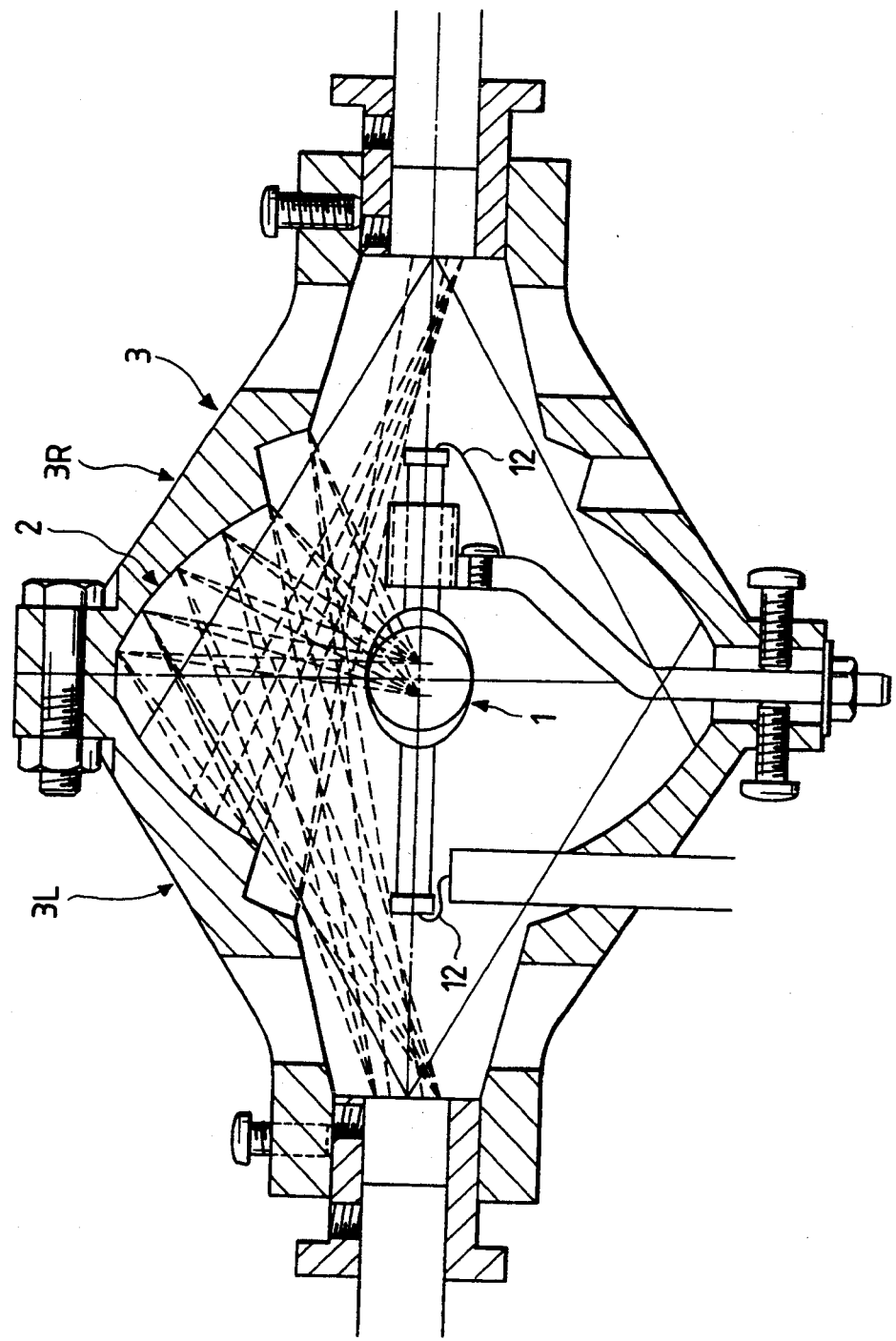
FIG. 5 is a cross-sectional view showing an arrangement of a light source apparatus according to a fourth embodiment of this invention.

FIG. 5 is a cross-sectional view showing an arrangement of a light source apparatus according to a fourth embodiment of this invention. In this embodiment, the case 3 is constructed such that two members 3R and 3L each having a substantial circular truncated conical and hollow configuration and having at its inside a circular reflecting surface assembly 2 are at their bottom surfaces connected to each other so that the central axes of the two members 3R and 3L are coincident with each other to form the central axis of the case 3. The circular reflecting surface assembly 2 comprises the large right-side or left-side ellipsoidal mirror 20R or 20L and the ellipsoidal mirror 23R or 23L illustrated in FIG. 4 but not comprising the outermost ellipsoidal mirror 24R or 24L. That is, in the case that the light source 1 has lead pins 12 at its both sides as illustrated in FIG. 5, the quantity of the light emitted from the light source toward the lead pins 12 is little and hence the omission of the right-side and left-side ellipsoidal mirrors 24R and 24L does not cause the efficiency of light condensation to greatly decrease. An advantage of this embodiment is that it is possible to easily machine the reflection surfaces 2 and further to easily assemble the light source apparatus. That is, the ellipsoidal mirror surfaces can easily be machined from the bottom sides of the members 3R and 3L, and the coupling of the two members 3R and 3L can be effected by a desirable method such as the adhesion, fusion and attachment by screws. In addition, the pattern draw in the injection molding can easily be effected.

Figure 6:
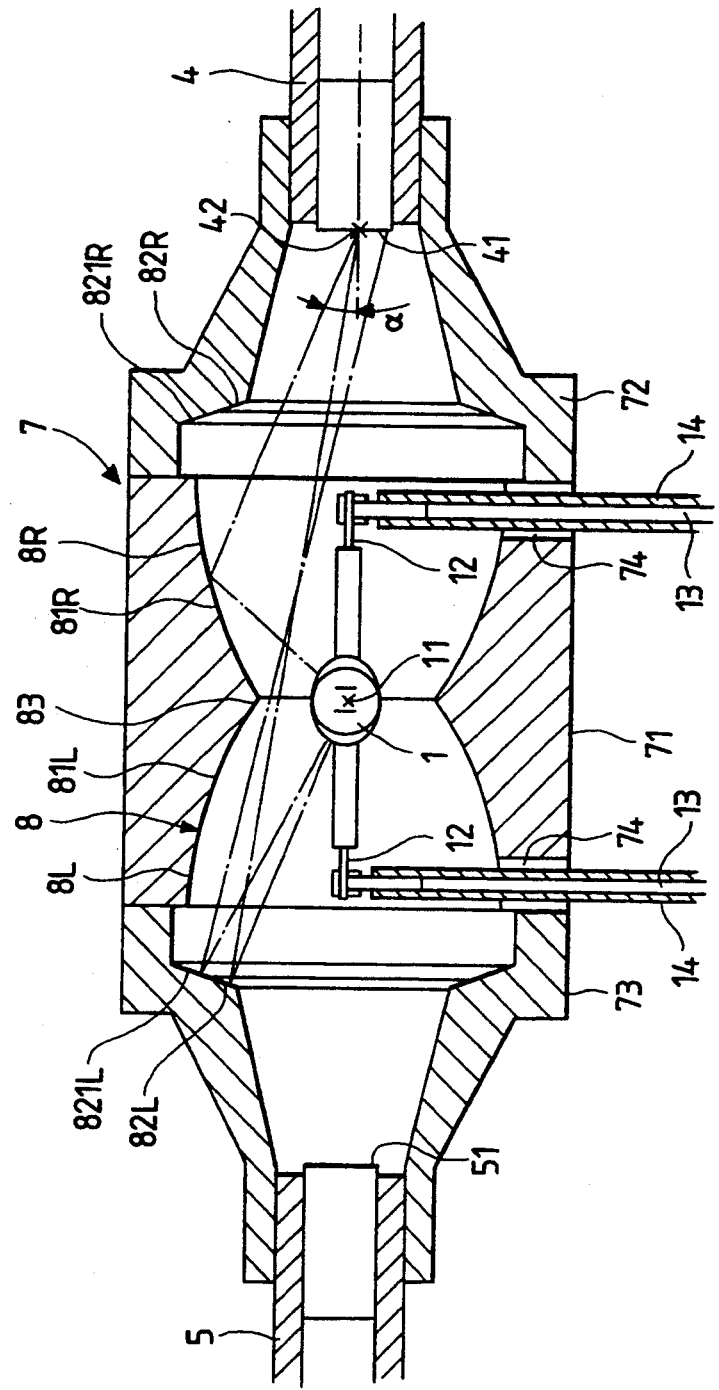
FIG. 6 is a cross-sectional view showing an arrangement of a light source apparatus according to a fifth embodiment of this invention.

FIG. 6 is a cross-sectional view showing an arrangement of a light source apparatus according to a fifth embodiment of this invention. The light source apparatus, designated at numeral 100, comprises a substantial cylindrical case 7 having an outer diameter smaller than that of the case 3 in the above-described first embodiment. Each of the spheroidal surfaces of ellipsoidal mirrors of the case 7 is arranged such that its major axis is longer and its minor axis is shorter as compared with that of the case 3 in the first embodiment. As a result, the distance between the light source 1 and the end surface 41 of the optical fiber 4 or the end surface 51 of the optical fiber 5 becomes longer.

The case 7 comprises an intermediate cylindrical portion 71, a right-side wall portion 72 and a left-side wall portion 73. A circular reflecting surface assembly 8 formed inside the case 7 comprises a group of right side ellipsoidal reflecting mirrors 8R and a group of left-side ellipsoidal reflecting mirrors 8L. The ellipsoidal reflecting mirror group 8R is composed of a first right-side ellipsoidal mirror 81R constructed at the right half of the intermediate cylindrical portion 71 and made longer as compared with the first right-side ellipsoidal mirror 21R in the first embodiment (that is, made such that the distance between the center 11 and the center 42 is greater and the sum of the distances from these two fixed points is smaller). The first right-side ellipsoidal reflecting mirror 81R is for condensing the light onto the end surface 41 of the right-side optical fiber 4. Further, the ellipsoidal reflecting mirror group 8R is composed of a second right-side ellipsoidal mirror 82R constructed at the right-side wall portion 72. The second right-side ellipsoidal mirror 82R is for condensing the light onto the end surface of the left-side optical fiber 5. The second right-side ellipsoidal mirror 82R has a circumferential portion 821R whose inclination is somewhat made great (the sum of the distances from the two fixed points is somewhat made small).

The left-side ellipsoidal reflecting mirror group 8L is disposed to be symmetrical with respect to the right-side ellipsoidal reflecting mirror group 8R, and comprises a first left-side ellipsoidal mirror 81L for condensing the light on the end surface 51 of the left-side optical fiber 5 and a second left-side ellipsoidal mirror 82L constructed at the left-side wall portion 73 for condensing the light on the end surface 41 of the right-side optical fiber 4. The second left-side ellipsoidal mirror 82L has a circumferential portion 821L whose inclination is somewhat made great.

Lead holes 74 are formed in both the end portions of the intermediate cylindrical portion 71, and bar-like lead terminals 13 of the light source 1 are coated by heat-resistant and voltage-resistant tubes 14 and inserted into the lead holes 74. To the tip portions of the lead terminals 13 there are connected the tip portions of the above-mentioned lead pins 12.

In operation, the light emitted from the light source 1 is reflected by the first right-side ellipsoidal mirror 81R and the second left-side ellipsoidal mirror 82L so as to be condensed on the end surface 41 of the right-side optical fiber 4. Since the light source has the width d, the light beams are incident on the end surface 41 thereof indicated by dashed lines in the illustration. At this time, the light reflected on the first right-side ellipsoidal mirror 81R is incident on the end surface 41 with the incident angle $\alpha$ being small (the average incident angle is about 12 degrees). The light to be incident on the left-side optical fiber 5 is the same as the light incident on the right-side optical fiber 4.

Here, in order to prevent the reflected light from being cut by an intermediate protrusive portion 83 between the first right-side ellipsoidal mirror 81R and the first left-side ellipsoidal mirror 81L, the circumferential portions 821R and 821L of the second ellipsoidal mirrors 82R and 82L are more inclined as compared with the second ellipsoidal mirrors 82R and 82L.

Advantages of this embodiment is as follows. That is, since the average value of the incident angles $\alpha$ incident on each of the end surfaces 41 and 51 of the optical fibers 4 and 5 is small, the number of times of reflection of light within the optical fibers 4 and 5 becomes small and the optical path can be shortened. As a result, the quantity of the light from the light source 1 can be prevented from being reduced by the absorption and reflection (attenuation) due to the optical fibers 4 and 5. In addition, the broadening of the light outgoing from the optical fibers 4 and 5 is little, whereby it is possible to easily form a light spot. Accordingly, the diameter of a condensing lens can be reduced so as to improve the total efficiency of the system which condenses the light generated by a condenser, comprising the light source 1 and the case 7, and outgone from the optical fibers 4 and 5.

Figure 7:
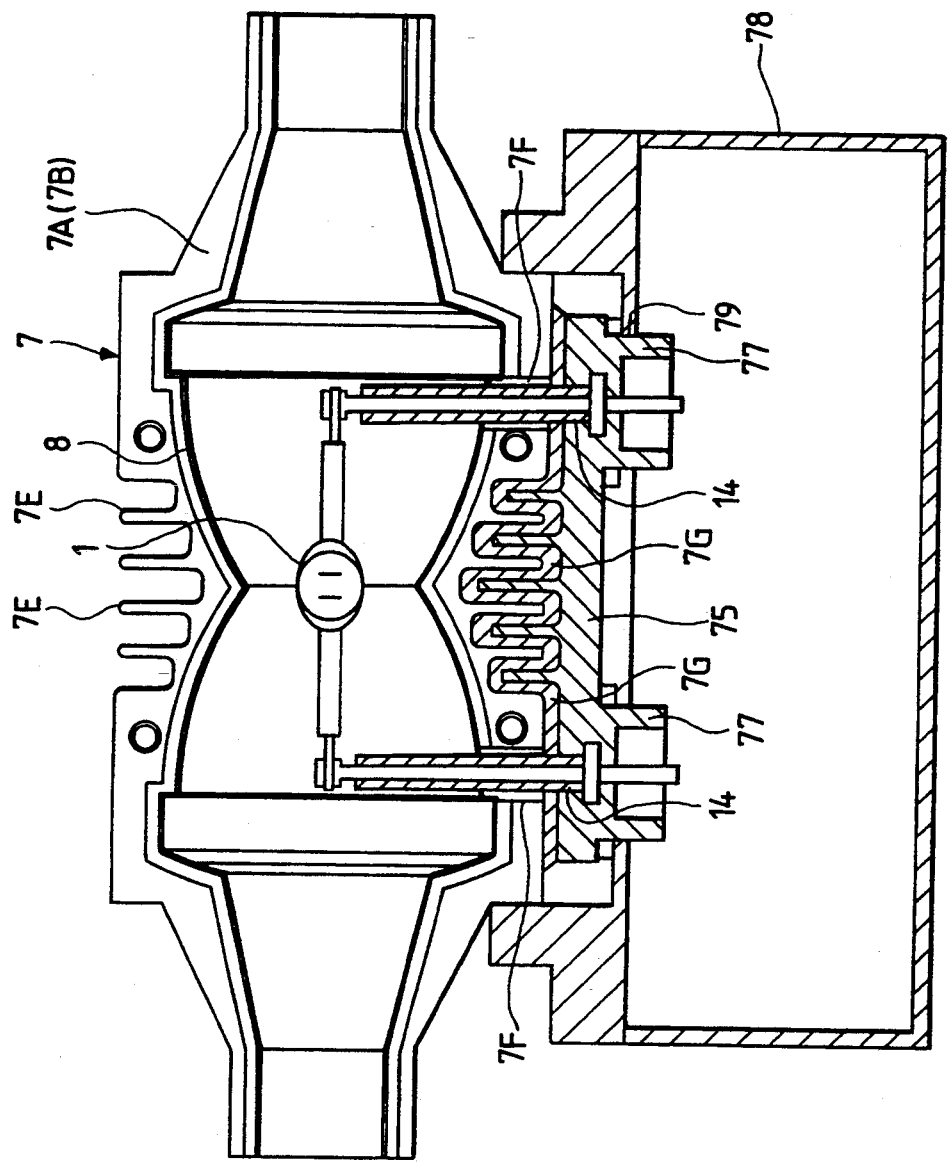
FIGS. 7 and 8 are illustrations for describing a structure of a case used in the fifth embodiment of this invention.
Figure 8:
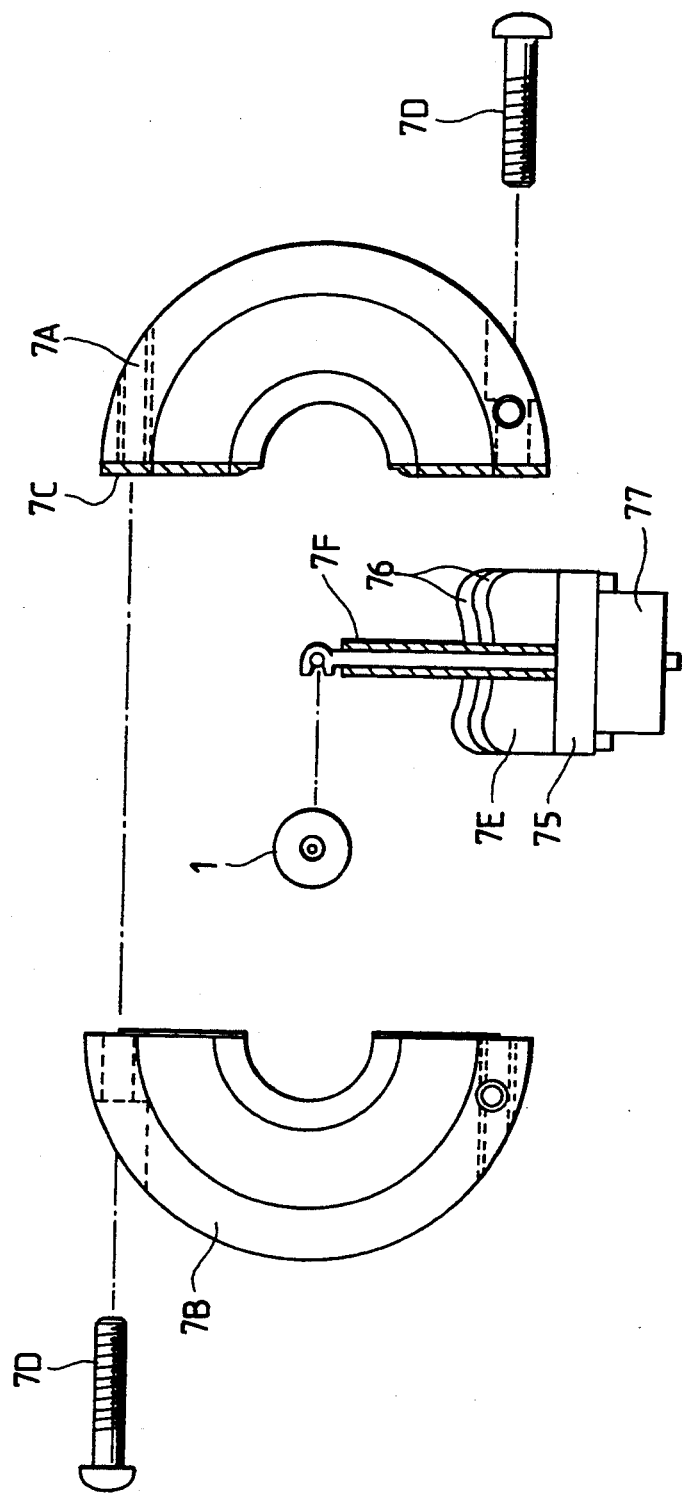

FIGS. 7 and 8 are illustrations for describing the structure of the case 7. The case 7 is divided into two portions (divisions) 7A and 7B in the axis directions. These two portions 7A and 7B are abutted against each other with a packing 7C interposed therebetween, and coupled to each other by means of a plurality of screws 7D. On the outer circumference of each of the two portions 7A and 7B, a number of radiating fins 7E are radially formed by the integral formation technique. Further, in the division surface of each of the two portions 7A and 7B, there are formed semi-cylindrical grooves 7F for inserting the above-mentioned voltage-resistant tubes 14. The two portions 7A and 7B are made of a metal or a resin. In the case of constructing them by the resin, the entire inner surface including the reflecting surface 8 is surface-treated by a metal and grounded for the EMI countermeasures.

On the lower surface of the case 7, there is provided an electrode holder 75 which has at an intermediate portion of its upper surface a number of fins 76 lined successively and fitted in between the above-mentioned radiating fins 7E. The fins 76 and the radiating fins 7E are coupled to each other through an adhesive 7G. Further, at end lower portions of the electrode holder 75 there are provided connectors 77 through which the other end portions of the above-mentioned lead terminals 13 pass. In addition, below the electrode holder 75 there is provided an enclosing box 78 for enclosing a light source control circuit and others. This enclosing box 78 is fixedly attached to the electrode holder 75 with portions of electrode holder 75 being fitted in holes formed in the ceiling of the enclosing box 78.

With this arrangement, the outer diameter of the case 7 can be reduced to allow an easy provision of the light source apparatus and the number of parts of the case is small to easily manufacture and assemble the light source apparatus. In addition, when the electrode holder 75 is attached to the lower surface of the case 7, it is possible to perform the adjustment whereby the light source 1 is set at the central position of the reflecting surface 8. Moreover, it is possible to effectively radiate the heat of the case 7.

FIG. 9 shows a structure of another case to be used for the light source apparatus according to the fifth embodiment of this invention. The case, designated at 9, is divided in directions perpendicular to its own axis into four portions: a right-side intermediate cylinder 91R, a left-side intermediate cylinder 91L, a right-side wall 92R and a left-side wall 92L. The right-side and left-side intermediate cylinders 91R and 91L, together with a circular connecting member 93, are screwed from the lower side to be coupled to each other. The right-side and left-side walls 92R and 92L are respectively connected at their circumferential portions to the right-side and left-side intermediate cylinders 91R and 91L by means of screws 94. The lead terminals 13 is arranged to be led from the divided portions to the outside, whereby it is possible to easily assemble the case 9.

An electrode holder 95 is provided on the lower surface of the case 9. This electrode holder 95 is fixedly attached to the center portion of the connecting member 93 by means of a screw 96, and equipped with connectors 97 through which the other end portions of the above-mentioned lead terminals 13 pass.

In this structure, the circular reflecting surfaces, formed in parts constituting the case 9, have simple configurations, and hence it is possible to easily form the reflecting surfaces by the machining.

FIG. 10 shows the light source apparatus according to this invention which is applied to headlamps of a motor vehicle designated at 200. The optical fibers 4 and 5 of the light source apparatus 100 are arranged to extend from both the sides thereof toward the headlamps H1 and H2 and the lights emitted from the tip portions of the optical fibers 4 and 5 are respectively reflected forward by mirrors M1 and M2 disposed within the headlamps H1 and H2. According to this invention, since being arranged such that the light emitted from the light source is condensed onto two optical fibers, the light source apparatus is suitable for illumination apparatus such as headlamps of a motor vehicle, an illumination device for a microscope and an illumination device for offering a cubic effect where two portions are paired.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A light source apparatus comprising:
    a case having opposing end portions;
    a pair of optical fibers disposed in opposing relation at said opposite end portions of said case such that an end surface of each optical fiber faces an interior of said case;
    a light source disposed within said case; and
    a plurality of circular reflecting surfaces defined by a machined inner circumferential surface of said case, wherein said circular reflecting surfaces are arranged in opposed relation to each other,
    wherein light emitted from said light source is reflected by said plurality of circular reflecting surfaces and condensed on said end surfaces of said optical fibers.

2. An apparatus as claimed in claim 1, wherein said each of said circular reflecting surfaces include a spheroidal surface having its focal point positioned at said light source, said spheroidal surface being located on said inner surface of said case such that light provided by said light source and reflected off of said spheroidal surface is aimed generally at a center of one of said end surfaces of said optical fibers.

3. An apparatus as claimed in claim 1, wherein said circular reflecting surfaces are stepped with respect to each other.

4. An apparatus as claimed in claim 1, wherein said plurality of circular reflecting surfaces comprise of conical surfaces.

5. An apparatus as claimed in claim 1, wherein said case is divided into a plurality of portions by at least one plane, wherein said at least one plane includes an axis of said case extending between said end surfaces of said optical fibers, said plurality of portions being abutted against each other to be coupled to each other to construct said case.

6. An apparatus as claimed in claim 1, wherein said case is divided into a plurality of portions by at least one plane, wherein said at least one plane is perpendicular to an axis of said case extending between said end surfaces of said optical fibers, said plurality of portions of said case being coupled coaxially to each other to form said case.

7. An apparatus as claimed in claim 1, wherein said light source is disposed at the vicinity of a central point between said end surfaces of said optical fibers.

8. An apparatus as claimed in claim 1, wherein said light source is disposed at the vicinity of a center of said case.

9. An apparatus as claimed in claim 1, wherein said circular reflecting surfaces comprise a first group of ellipsoidal mirrors and a second group of ellipsoidal mirrors, said first group of ellipsoidal mirrors provided between said light source and said end surfaces of one of said optical fibers and said second group of ellipsoidal mirrors provided between said light source and said end surface of said other optical fiber, and wherein said first group of ellipsoidal mirrors and said second group of ellipsoidal mirrors are disposed symmetrically with respect to said light source.

10. An apparatus as claimed in claim 1, wherein said circular reflecting surfaces comprise ellipsoidal mirrors which are connected to each other through conical surfaces.

11. A light source comprising:
    a case having end portions at opposite end, thereof;
    a pair of optical fibers disposed in opposing relation at said opposite end portions of said case such that an end surface of each optical fiber faces an interior of said case;
    a light source disposed within said case;

a plurality of circular reflecting surfaces formed on an inner surface of said case so as to be arranged in opposing relation to each other wherein said plurality of circular reflecting surfaces comprises a first group of ellipsoidal mirrors and a second group of ellipsoidal mirrors, said first group of ellipsoidal mirrors and said second group of ellipsoidal mirrors being symmetrically disposed with respect to said light source, wherein said ellipsoidal mirrors of each of said first group of ellipsoidal mirrors and said second group of ellipsoidal mirrors are connected to each other through conical surfaces whose fixed point exist on one of said end surfaces of said optical fibers, and wherein light emitted from said light source is reflected by said plurality of circular reflecting surfaces and condensed on said end surfaces of said optical fibers.

12. A light source apparatus comprising:

a light source;

first and second optical fibers each having light incident end surfaces, said light incident end surfaces being disposed in opposed relation to each other with respect to said light source;

first and second reflecting surfaces provided around a line extending between said light source and said light incident end surface of said first optical fiber, said first reflecting surface being adapted to condense light from said light source onto said light incident end surface of said first optical fiber, said second reflecting surface being adapted to condense light from said light source onto said light incident end surface of said second optical fiber; and a third reflecting surface provided around a line extending between said light source and said light incident end surface of said second optical fiber, said third reflecting surface being adapted to condense light from said light source onto one of said light incident end surfaces of said first and second optical fibers.

13. An apparatus as claimed in claim 12, wherein each of said first, second, and third reflecting surfaces is a spheroidal surface having a focal point which is positioned at said light source and aimed such that light provided by said light source is reflected off of said first, second, and third reflecting in a direction toward a vicinity of a center of the corresponding one of said light incident end surfaces of said first and second optical fibers.

14. An apparatus as claimed in claim 12, wherein said first, second, and third reflecting surfaces are stepped with respect to each other.

15. An apparatus as claimed in claim 12, wherein said light source and said first, second, and third reflecting surfaces are provided in a case, and said first and second optical fibers are provided at end portions of said case such that said light incident end surfaces are arranged in opposed relation to each other, and wherein said case is divided into a plurality of portions by at least one plane including therein an axis extending between said light incident end surfaces of the first and second optical fibers, said divided portions of said case being coupled to each other to form said case.

16. An apparatus as claimed in claim 12, wherein said light source and said first, second, and third reflecting surfaces are provided in a case, and said first and second optical fibers are provided at end portions of said case such that said light incident end surfaces of said first and second optical fibers are arranged in opposed relation to each other, and wherein said case is divided into a plurality of portions by at least one plane located perpendicular to an axis extending between said light incident end surfaces of the first and second optical fibers, said divided portions of said case being coupled coaxially to each other to form said case.

17. An apparatus as claimed in claim 12, further comprising at least one additional reflecting surface, and wherein said first, second, and third reflecting surfaces and said at least one additional reflecting surface are in the form of ellipsoidal mirrors which are connected to each other through conical surfaces.

18. An apparatus as claimed in claim 12, further comprising a fourth reflecting surface provided around said line extending between said light source and said light incident end surface of said second optical fiber, said fourth reflecting surface being adapted to condense light from said light source onto another of said light incident end surfaces of said first and second optical fibers.

* * * * *

UNITED STATES PATENT AND TRADEMARK OFFICE
CERTIFICATE OF CORRECTION

PATENT NO.   : 5,416,669
DATED        : May 16, 1995
INVENTOR(S)  : Hideyuki Kato, Shinji Hamba It is certified that error appears in the above-identified patent and that said Letters Patent is hereby corrected as shown below:

TITLE PAGE
(Item [75] Inventors)
    Kindly change second inventor's name from "Sinji Namba" to --Shinji Namba--.

Signed and Sealed this

Twelfth Day of September, 1995

Attest:

BRUCE LEHMAN

*Attesting Officer*     *Commissioner of Patents and Trademarks*